United States Patent
Kato

(10) Patent No.: US 8,089,177 B2
(45) Date of Patent: Jan. 3, 2012

(54) POWER SUPPLY SYSTEM, VEHICLE HAVING POWER SUPPLY SYSTEM, AND CONTROL METHOD OF POWER SUPPLY SYSTEM

(75) Inventor: Norihiko Kato, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 485 days.

(21) Appl. No.: 12/385,578

(22) Filed: Apr. 13, 2009

(65) Prior Publication Data

US 2009/0261658 A1    Oct. 22, 2009

(30) Foreign Application Priority Data

Apr. 18, 2008 (JP) ................................ 2008-109334

(51) Int. Cl.
*B60L 1/00* (2006.01)
(52) U.S. Cl. .................................................. 307/10.1
(58) Field of Classification Search .................. 307/9.1, 307/10.1; 320/134, 136, 128; 180/65.1, 180/65.21; 324/430
See application file for complete search history.

(56) References Cited

U.S. PATENT DOCUMENTS

| | | | | |
|---|---|---|---|---|
| 6,608,396 B2* | 8/2003 | Downer et al. | ............. | 290/40 C |
| 7,075,306 B2 | 7/2006 | Emori et al. | | |
| 7,750,505 B2* | 7/2010 | Ichikawa | ........................ | 307/82 |
| 7,795,844 B2* | 9/2010 | Ichikawa et al. | ............... | 320/134 |
| 7,847,432 B2* | 12/2010 | Ichikawa | ........................ | 307/45 |
| 7,923,866 B2* | 4/2011 | Ichikawa et al. | ................ | 307/82 |
| 7,928,603 B2* | 4/2011 | Ichikawa | ........................ | 307/45 |
| 7,939,969 B2* | 5/2011 | Ichikawa et al. | ................ | 307/82 |
| 7,956,489 B2* | 6/2011 | Ichikawa et al. | ............. | 307/10.1 |
| 7,989,978 B2* | 8/2011 | Ichikawa | ........................ | 307/9.1 |
| 2004/0135544 A1* | 7/2004 | King et al. | .................... | 320/116 |
| 2004/0135545 A1* | 7/2004 | Fowler et al. | ................. | 320/118 |
| 2009/0058329 A1* | 3/2009 | Ichikawa | ..................... | 318/139 |
| 2009/0067202 A1* | 3/2009 | Ichikawa et al. | ................ | 363/79 |
| 2009/0145675 A1* | 6/2009 | Ichikawa | ..................... | 180/65.1 |
| 2009/0179616 A1* | 7/2009 | Ichikawa et al. | ............. | 320/134 |
| 2009/0183934 A1* | 7/2009 | Oyobe et al. | ............ | 180/65.265 |
| 2009/0195067 A1* | 8/2009 | Ichikawa et al. | .............. | 307/9.1 |
| 2009/0243385 A1* | 10/2009 | Ichikawa | ....................... | 307/9.1 |
| 2009/0261658 A1* | 10/2009 | Kato | ............................. | 307/82 |
| 2009/0273235 A1* | 11/2009 | Ichikawa | ....................... | 307/9.1 |

(Continued)

FOREIGN PATENT DOCUMENTS

JP    A-09-233710    9/1997

(Continued)

*Primary Examiner* — Jared Fureman
*Assistant Examiner* — Daniel Cavallari
(74) *Attorney, Agent, or Firm* — Oliff & Berridge, PLC

(57) ABSTRACT

A discharge distribution ratio calculating unit calculates a discharge distribution ratio, according to the ratio between an amount of electric power allowed to be discharged from a first storage device connected to a first converter, and the sum of amounts of electric power allowed to be discharged from second and third storage devices. A charge distribution ratio calculating unit calculates a charge distribution ratio, according to the ratio between an amount of electric power with which the first storage device is allowed to be charged, and an amount of electric power with which the storage device electrically connected to the second converter by a switching device is allowed to be charged. Then, the first and second converters are controlled according to the discharge distribution ratio in a discharge mode, or according to the charge distribution ratio in a charge mode.

12 Claims, 7 Drawing Sheets

U.S. PATENT DOCUMENTS

| | | | | |
|---|---|---|---|---|
| 2009/0289497 | A1* | 11/2009 | Ichikawa et al. | 307/9.1 |
| 2009/0315392 | A1* | 12/2009 | Ichikawa et al. | 307/9.1 |
| 2010/0001583 | A1* | 1/2010 | Ichikawa | 307/10.1 |
| 2010/0019729 | A1* | 1/2010 | Kaita et al. | 320/134 |
| 2010/0065349 | A1* | 3/2010 | Ichikawa et al. | 180/65.1 |

FOREIGN PATENT DOCUMENTS

| | | |
|---|---|---|
| JP | A-09-298805 | 11/1997 |
| JP | A-2004-215459 | 7/2004 |
| JP | 3655277 B2 | 6/2005 |
| JP | A-2008-109840 | 5/2008 |

* cited by examiner

POWER SUPPLY SYSTEM, VEHICLE HAVING POWER SUPPLY SYSTEM, AND CONTROL METHOD OF POWER SUPPLY SYSTEM

INCORPORATION BY REFERENCE

The disclosure of Japanese Patent Application No. 2008-109334 filed on Apr. 18, 2008, including the specification, drawings and abstract, is incorporated herein by reference in its entirety.

BACKGROUND OF THE INVENTION

1. Field of the Invention

The invention relates to charge and discharge control of a power supply system including a plurality of storage devices.

2. Description of the Related Art

Japanese Patent No. 3655277 discloses a power control system including a plurality of power stages. The power control system includes a plurality of power stages that are connected in parallel with each other and supply DC power to at least one inverter. Each of the power stages includes a battery and a boost/buck DC-DC converter.

In the power control system, the above-indicated plurality of power stages are controlled so as to uniformly or evenly charge and discharge a plurality of batteries included in the respective power stages, so as to achieve a balanced SOC (State Of Charge) for each of the batteries.

However, if the batteries are uniformly charged and discharged, as in the power control system disclosed in Japanese Patent No. 3655277 as identified above, one of the batteries may reach a discharge limit or charge limit at an earlier time than the other battery or batteries in the case where the batteries have different charging and/or discharging characteristics, for example. In this case, the power supply system as a whole is not able to provide the maximum charging characteristic or discharging characteristic after any one of the batteries reaches the charge or discharge limit.

Also, the boost/buck DC-DC converter is provided in each power stage of the power control system as described above, which results in a large increase in the cost. It is, therefore, proposed to use a switching device for permitting some batteries to be selectively connected to one converter, and switch a battery connected to the converter to another one when the SOC of the battery that is currently used is reduced. With this arrangement, however, the battery or batteries in use may be overcharged during regenerative charging unless electric power is appropriately distributed to the batteries in use.

SUMMARY OF THE INVENTION

The present invention provides a power supply system which includes a plurality of storage devices to provide sufficient charging and discharging characteristics, and is able to prevent the storage device in use from being overcharged, and provides a vehicle having the power supply system.

A first aspect of the invention is concerned with a power supply system. The power supply system, which is capable of supplying and receiving electric power to and from a load device, includes a power line, first converter and second converter, rechargeable first storage device, a plurality of rechargeable second storage devices, switching device and a control device. The power line is provided for supplying and receiving electric power between the power supply system and the load device. The first and second converters are connected in parallel with each other to the power line. The first storage device is connected to the first converter. The switching device is provided between the plurality of second storage devices and the second converter, and is arranged to be able to connect one of the second storage devices to the second converter according to a given command. The control device controls the first and second converters and the switching device. The control device includes a switching control unit, a discharge distribution ratio calculating unit, a charge distribution ratio calculating unit, and a converter control unit. The switching control unit produces the command for selecting a storage device to be used from the plurality of second storage devices in sequence, and sends the command to the switching device, so that, when a quantity of state (SOC) indicative of a state of charge of the second storage device connected to the second converter becomes smaller than a specified value, a remaining one of the second storage devices, whose quantity of state (SOC) is not smaller than the specified value, is connected to the second converter. The discharge distribution ratio calculating unit that calculates a discharge distribution ratio indicative of a proportion between electric power discharged from the first storage device and electric power discharged from the second storage device connected to the second converter by the switching device. The charge distribution ratio calculating unit calculates a charge distribution ratio indicative of a proportion between electric power supplied for charging the first storage device and electric power supplied for charging the second storage device connected to the second converter by the switching device. The converter control unit controls the first and second converters according to the discharge distribution ratio, in a discharge mode in which electric power is supplied from the power supply system to the load device, and controls the first and second converters according to the charge distribution ratio, in a charge mode in which electric power is supplied from the load device to the power supply system. The discharge distribution ratio calculating unit calculates an amount of electric power that is allowed to be discharged from each of the first storage device and the plurality of second storage devices, and calculates the discharge distribution ratio, according to a ratio between the amount of electric power allowed to be discharged from the first storage device, and the sum of the amounts of electric power allowed to be discharged from the plurality of second storage devices. The charge distribution ratio calculating unit calculates an amount of electric power with which each of the first storage device and the second storage device connected to the second converter is allowed to be charged, and calculates the charge distribution ratio, according to a ratio between the amount of electric power with which the first storage device is allowed to be charged, and the amount of electric power with which the second storage device connected to the second converter is allowed to be charged.

The electric power that can be supplied from each of the first storage device and the plurality of second storage devices may be limited when the quantity of state (SOC) of the corresponding storage device becomes smaller than a specified lower limit, and the electric power that can be supplied to each of the first storage device and the plurality of second storage devices may be limited when the quantity of state (SOC) of the corresponding storage device exceeds a specified upper limit.

The discharge distribution ratio calculating unit may calculate the amount of electric power that is allowed to be discharged from each of the first storage device and the plurality of second storage devices, based on a value obtained by subtracting the lower limit from the quantity of state (SOC) indicative of the current state of charge of the corresponding storage device, and a storage capacity of the corresponding storage device. The charge distribution ratio calculating unit may calculate the amount of electric power with which each of the first storage device and the second storage device connected to the second storage device is allowed to be charged, based on a value obtained by subtracting the quantity of state (SOC) indicative of the current state of charge of the corresponding storage device from the upper limit, and the storage capacity of the corresponding storage device.

The converter control unit may include a first control unit and a second control unit. The first control unit may control the first converter so as to regulate a voltage of the power line to a given target voltage. The second control unit may control the second converter so as to control charge and discharge of the second storage device connected to the second converter, to given target amounts.

The switching device may include a plurality of relays. Each of the relays may be connected between each of the second storage devices and the second converter.

A second aspect of the invention is concerned with a vehicle. The vehicle includes the power supply system according to the first aspect of the invention, and a driving force generating unit. The driving force generating unit receives electric power from the power supply system and generates driving force of the vehicle.

A third aspect of the invention is concerned with a control method of a power supply system. The control method is a method of controlling a power supply system capable of supplying and receiving electric power to and from a load device. The power supply system includes a power line, first converter and second converter, a rechargeable first storage device, a plurality of rechargeable second storage devices, and a switching device. The power line is provided for supplying and receiving electric power between the power supply system and the load device. The first and second converters are connected in parallel with each other to the power line. The first storage device is connected to the first converter. The switching device is provided between the above-indicated plurality of second storage devices and the second converter, and is arranged to be able to connect one of the second storage devices to the second converter. The control method includes a step of controlling the switching device so that, when a quantity of state (SOC) indicative of a state of charge of the second storage device connected to the second converter becomes smaller than a specified value, a remaining one of the second storage devices, whose quantity of state (SOC) is not smaller than the specified value, is connected to the second converter, a step of calculating a discharge distribution ratio indicative of a proportion between electric power discharged from the first storage device and electric power discharged from the second storage device connected to the second converter by the switching device, a step of calculating a charge distribution ratio indicative of a proportion between electric power supplied for charging the first storage device and electric power supplied for charging the second storage device connected to the second converter by the switching device, and a step of controlling the first and second converters according to the discharge distribution ratio, in a discharge mode in which electric power is supplied from the power supply system to the load device, and controlling the first and second converters according to the charge distribution ratio, in a charge mode in which electric power is supplied from the load device to the power supply system. The step of calculating the discharge distribution ratio includes a sub-step of calculating an amount of electric power that is allowed to be discharged from each of the first storage device and the plurality of second storage devices, and a sub-step of calculating the discharge distribution ratio, according to a ratio between the amount of electric power allowed to be discharged from the first storage device, and a sum of the amounts of electric power allowed to be discharged from the plurality of second storage devices. The step of calculating the charge distribution ratio includes a sub-step of calculating an amount of electric power with which each of the first storage device and the second storage device connected to the second converter is allowed to be charged, and a sub-step of calculating the charge distribution ratio, according to a ratio between the amount of electric power with which the first storage device is allowed to be charged, and the amount of electric power with which the second storage device connected to the second converter is allowed to be charged.

The electric power that can be supplied from each of the first storage device and the plurality of second storage devices may be limited when the quantity of state (SOC) of the corresponding storage device becomes smaller than a specified lower limit. The electric power that can be supplied to each of the first storage device and the plurality of second storage devices may be limited when the quantity of state (SOC) of the corresponding storage device exceeds a specified upper limit.

In the sub-step of calculating the amount of electric power allowed to be discharged, the amount of electric power that is allowed to be discharged from each of the first storage device and the plurality of second storage devices may be calculated, based on a value obtained by subtracting the lower limit from the quantity of state (SOC) indicative of the current state of charge of the corresponding storage device, and a storage capacity of the corresponding storage device. In the sub-step of calculating the amount of electric power allowed to be supplied for a charge, the amount of electric power with which each of the first storage device and the second storage device connected to the second storage device is allowed to be charged may be calculated, based on a value obtained by subtracting the quantity of state (SOC) indicative of the current state of charge of the corresponding storage device from the upper limit, and the storage capacity of the corresponding storage device.

In the step of controlling the first and second converters, the first converter may be controlled so as to regulate a voltage of the power line to a given target voltage, and the second converter may be controlled so as to control charge and discharge of the second storage device connected to the second converter, to given target amounts.

According to the present invention, when the quantity of state (SOC) indicative of the state of charge of the second storage device connected to the second converter becomes smaller than the specified value, a remaining one of the second storage devices whose quantity of state (SOC) is not smaller than the specified value is connected to the second converter. Thus, the plurality of second storage devices are switched from one to another in sequence and used. During a discharge mode, the discharge distribution ratio is calculated according to the ratio between the amount of electric power allowed to be discharged from the first storage device, and the sum of the amounts of electric power allowed to be discharged from the plurality of second storage devices, and the first and second converters are controlled according to the calculated discharge distribution ratio. With this arrangement, one of the first storage device and the second storage devices selectively used in sequence is less likely or unlikely to reach its discharge limit at an earlier time than the other storage device. During a charge mode, on the other hand, the charge distribution ratio is calculated according to the ratio of the amount of electric power with which the first storage device is allowed to be charged and the amount of electric power with which the second storage device connected to the second converter is allowed to be charged, and the first and second converters are controlled according to the calculated charge distribution ratio. With this arrangement, one of the first storage device and the storage device that is currently used is less likely or unlikely to reach its charge limit at an earlier time than the other storage device. Also, the discharge distribution ratio is calculated in the discharge mode, using the sum of the amounts of electric power allowed to be discharged from the second storage devices, whereas the charge distribution ratio is calculated in the charge mode, using the amount of electric power with which the storage device in use that is electrically connected to the second converter is allowed to be charged, so that the distribution ratio for the storage device in use is prevented from being higher than necessary.

Accordingly, the power supply system according to the present invention, which includes the above-indicated plurality of storage devices, provides sufficient charging and discharging characteristics, and is also able to prevent the second storage device in use from being overcharged.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
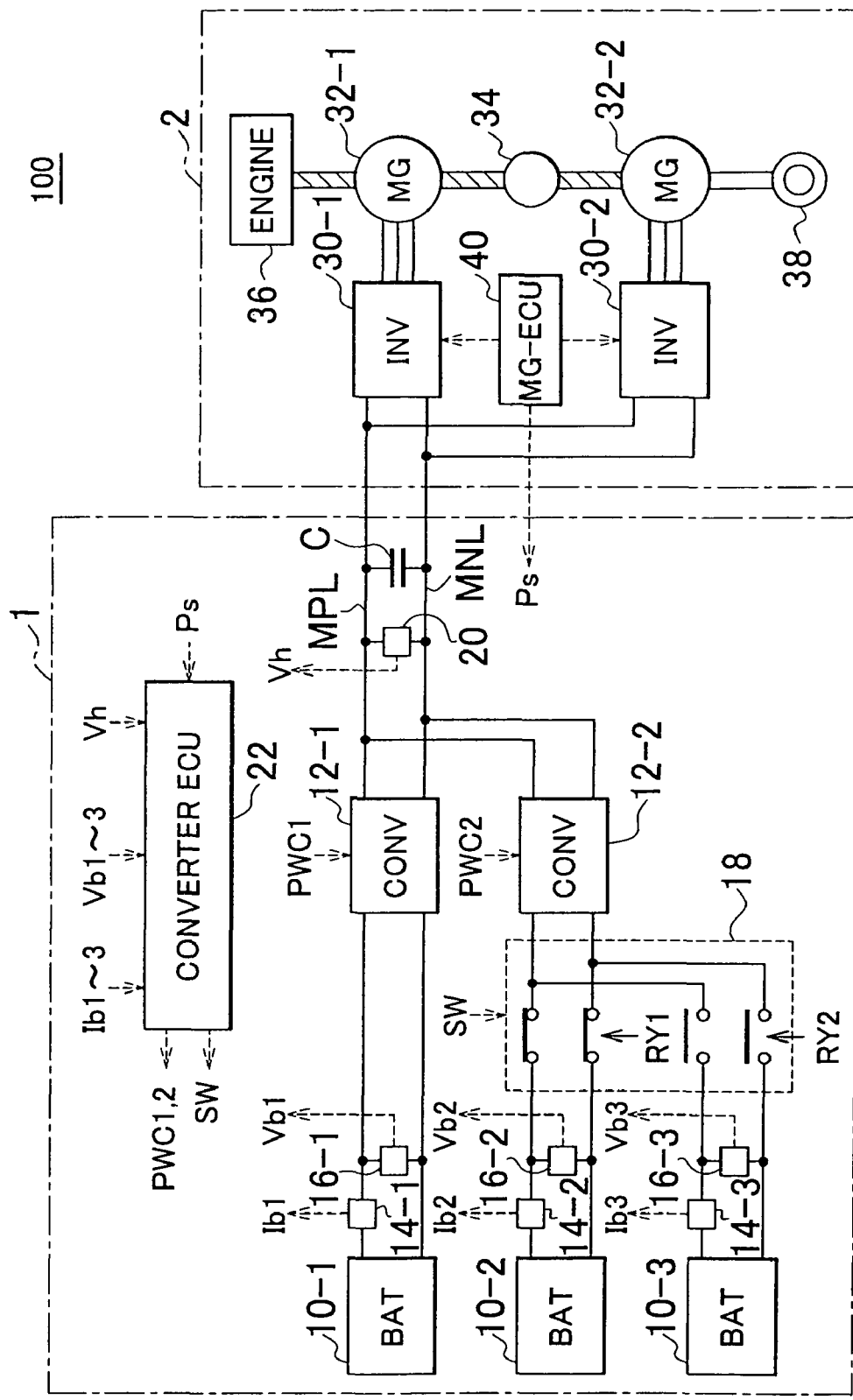
FIG. 1 is a general block diagram of a vehicle on which a power supply system according to one embodiment of the invention is installed.

FIG. 1 is a general block diagram of a vehicle having a power supply system according to one embodiment of the invention. Referring to FIG. 1, the vehicle 100 includes a power supply system 1 and a driving force generating unit 2. The driving force generating unit 2 includes a first inverter 30-1, second inverter 30-2, first MG (motor-generator) 32-1, second MG 32-2, power divider 34, engine 36, driving wheels 38, and MG-ECU (electronic control unit) 40.

The first MG 32-1, second MG 32-2 and the engine 36 are coupled to the power divider 34. The vehicle 100 runs with driving force from at least one of the engine 36 and the second MG 32-2. Power generated by the engine 36 is split into two paths by the power divider 34. Namely, the power of the engine 36 is transmitted in part to the driving wheels 38 via one of the two paths, and is transmitted in part to the first MG 32-1 via the other path.

Each of the first MG 32-1 and the second MG 32-2 is an AC rotary electric machine, and consists of, for example, a three-phase AC rotary electric machine having a rotor in which permanent magnets are embedded. The first MG 32-1 generates electric power, using the power of the engine 36 divided by the power divider 34. For example, when the SOC of a storage device or devices (which will be described later) included in the power supply system 1 becomes lower than a predetermined value, the engine 36 starts operating, to cause the first MG 32-1 to generate electric power, and the electric power thus generated is supplied to the power supply system 1.

The second MG 32-2 generates driving force, using at least one of electric power supplied from the power supply system 1 and electric power generated by the first MG 32-1. Then, the driving force of the second MG 32-2 is transmitted to the driving wheels 38. During braking of the vehicle, for example, the second MG 32-2 is driven by the driving wheels 38, and operates as a generator. Thus, the second MG 32-2 operates as a regenerative brake that converts braking energy to electric power. The electric power generated by the second MG 32-2 is then supplied to the power supply system 1.

The power divider 34 is comprised of a planetary gear set including a sun gear, pinion gear, carrier, and a ring gear. The pinion gear engages with the sun gear and the ring gear. The carrier supports the pinion gear such that the pinion gear is rotatable about itself, and is coupled to the crankshaft of the engine 36. The sun gear is coupled to a rotating shaft of the first MG 32-1. The ring gear is coupled to a rotating shaft of the second MG 32-2.

The first inverter 30-1 and the second inverter 30-2 are connected to a main positive bus MPL and a main negative bus MNL. The first inverter 30-1 and the second inverter 30-2 convert driving electric power (dc power) supplied from the power supply system 1 to ac power, and put out the ac power to the first MG 32-1 and the second MG 32-2, respectively. Also, the first inverter 30-1 and the second inverter 30-2 convert ac power generated by the first MG 32-1 and the second MG 32-2, respectively, into dc power, and put out the dc power as regenerative power to the power supply system 1.

Each of the first inverter 30-1 and the second inverter 30-2 consists of, for example, a bridge circuit including three-phase switching devices. Each of the inverters performs a switching operation in response to a drive signal from the MG-ECU 40, so as to drive the corresponding MG (motor-generator).

The MG-ECU 40 calculates a vehicle required power Ps, based on detection signals of various sensors (not shown), running conditions and the amount of depression of the accelerator pedal (or pedal effort), and calculates target values of the torque and rotational speed of the first MG 32-1 and second MG 32-2. Then, the MG-ECU 40 controls the first inverter 30-1 and the second inverter 30-2 so that the torques and rotational speeds of the first MG 32-1 and the second MG 32-2 become equal to the respective target values. Also, the MG-ECU 40 sends the calculated vehicle required power Ps to a converter ECU 22 (which will be described later) of the power supply system 1.

On the other hand, the power supply system 1 includes a first storage device 10-1, second storage device 10-2, third storage device 10-3, first converter 12-1, second converter 12-2, switching device 18, main positive bus MPL, main negative bus MNL, smoothing capacitor C, converter ECU 22, current sensors 14-1 to 14-3, and voltage sensors 16-1 to 16-3, 20.

Each of the first storage device 10-1, second storage device 10-2 and the third storage device 10-3 is a rechargeable dc power supply, and consists of, for example, a secondary battery, such as a nickel-metal hydride battery or a lithium-ion battery, or a capacitor having a large capacity, or the like. The first storage device 10-1 is connected to the first converter 12-1, and the second storage device 10-2 and third storage device 10-3 are connected to the switching device 18.

The switching device 18 is provided between the second storage device 10-2 and third storage device 10-3, and the second converter 12-2, and electrically connects a selected one of the second storage device 10-2 and the third storage device 10-3 to the second converter 12-2, according to a switching signal SW from the converter ECU 22. More specifically, the switching device 18 includes system relays RY1, RY2. The system relay RY1 is disposed between the second storage device 10-2 and the second converter 12-2. The system relay RY2 is disposed between the third storage device 10-3 and the second converter 12-2. When the switching signal SM is deactivated, for example, the system relays RY1, RY2 are turned ON and OFF, respectively. When the switching signal SM is activated, the system relays RY1, RY2 are turned OFF and ON, respectively.

The first converter 12-1 and the second converter 12-2 are connected in parallel with each other to the main positive bus MPL and the main negative bus MNL. The first converter 12-1 performs voltage conversion between the first storage device 10-1 and the main positive bus MPL and main negative bus MNL, based on a drive signal PWC1 from the converter ECU 22. The second converter 12-2 performs voltage conversion between one of the second storage device 10-2 and the third storage device 10-3 which is electrically connected to the second converter 12-2 via the switching device 18, and the main positive bus MPL and main negative bus MNL, based on a drive signal PWC2 from the converter ECU 22.

The smoothing capacitor C is connected between the main positive bus MPL and the main negative bus MNL, and operates to reduce electric-power varying or fluctuating components included in the main positive bus MPL and the main negative bus MNL. The voltage sensor 20 detects voltage Vh between the main positive bus MPL and the main negative bus MNL, and sends the detection value to the converter ECU 22.

The current sensors 14-1 to 14-3 detect current Ib1 flowing into and out of the first storage device 10-1, current Ib2 flowing into and out of the second storage device 10-2, and current Ib3 flowing into and out of the third storage device 10-3, respectively, and send the detection values to the converter ECU 22. Each of the current sensors 14-1 to 14-3 detects current (discharge current) flowing out of the corresponding storage device as a positive value, and detects current (charge current) flowing into the corresponding storage device as a negative value. While each of the current sensors 14-1 to 14-3 detects current through a positive line or bus in the embodiment of FIG. 1, each of the current sensors 14-1 to 14-3 may detect current through a negative line or bus.

The voltage sensors 16-1 to 16-3 detect voltage Vb1 across the first storage device 10-1, voltage Vb2 across the second storage device 10-2, and voltage Vb3 across the third storage device 10-3, respectively, and send the detection values to the converter ECU 22.

The converter ECU 22 produces a switching signal SW for switching between the second storage device 10-2 and the third storage device 10-3 connected to the switching device 18, to select one of the storage devices for use, and sends the produced switching signal SW to the switching device 18. For example, if the SOC of the second storage device 10-2 becomes lower than a specified value when the second storage device 10-2 is connected to the second converter 12-2 by the switching device 18, the converter ECU 22 produces a switching signal SW so as to turn off the system relay RY1 that has been in the ON state, and turn on the system relay RY2 that has been in the OFF state.

Also, the converter ECU 22 produces drive signals PWC1, PWC2 for driving the first converter 12-1 and the second converter 12-2, respectively, based on detection values received from the current sensors 14-1 to 14-3 and voltage sensors 16-1 to 16-3, 20, and the vehicle required power Ps from the MG-ECU 40. Then, the converter ECU 22 sends the produced drive signals PWC1, PWC2 to the first converter 12-1 and the second converter 12-2, respectively, so as to control the first converter 12-1 and the second converter 12-2.

When the power supply system 1 operates in a discharge mode in which electric power is supplied from the power supply system 1 to the driving force generating unit 2 (namely, when the vehicle required power Ps is larger than zero), the converter ECU 22 calculates a discharge distribution ratio indicative of the proportion between electric power discharged from the first storage device 10-1 and electric power discharged from the storage device electrically connected to the second converter 12-2 via the switching device 18, based on the ratio between the amount of electric power that is allowed to be discharged from the first storage device 10-1 connected to the first converter 12-1, and the sum of the amounts of electric power that is allowed to be discharged from the second storage device 10-2 and the third storage device 10-3 that can be connected to the second converter 12-2 via the switching device 18. Then, the converter ECU 22 controls the first converter 12-1 and the second converter 12-2, according to the calculated discharge distribution ratio.

Also, when the power supply system 1 is in a charge mode in which electric power is supplied from the driving force generating unit 2 to the power supply system 1 (namely, when the vehicle required power Ps is smaller than 0), the converter ECU 22 calculates a charge distribution ratio indicative of the proportion between electric power supplied to the first storage device 10-1 for a charge, and electric power supplied to the storage device connected to the second converter 12-2 for a charge, based on the ratio between the amount of electric power with which the first storage device 10-1 is allowed to be charged, and the amount of electric power with which the storage device electrically connected to the second converter 12-2 via the switching device 18 is allowed to be charged. Then, the converter ECU 22 controls the first converter 12-1 and the second converter 12-2, according to the calculated charge distribution ratio.

The converter ECU 22 controls the first converter 12-1 so as to regulate the voltage Vh to a given target voltage, and controls the second converter 12-2 so that charge and discharge of the storage device electrically connected to the second converter 12-2 via the switching device 18 are controlled to given target amounts. In the following description, the first converter 12-1 may also be called "master converter", and the second converter 12-2 may also be called "slave converter".

Figure 2:
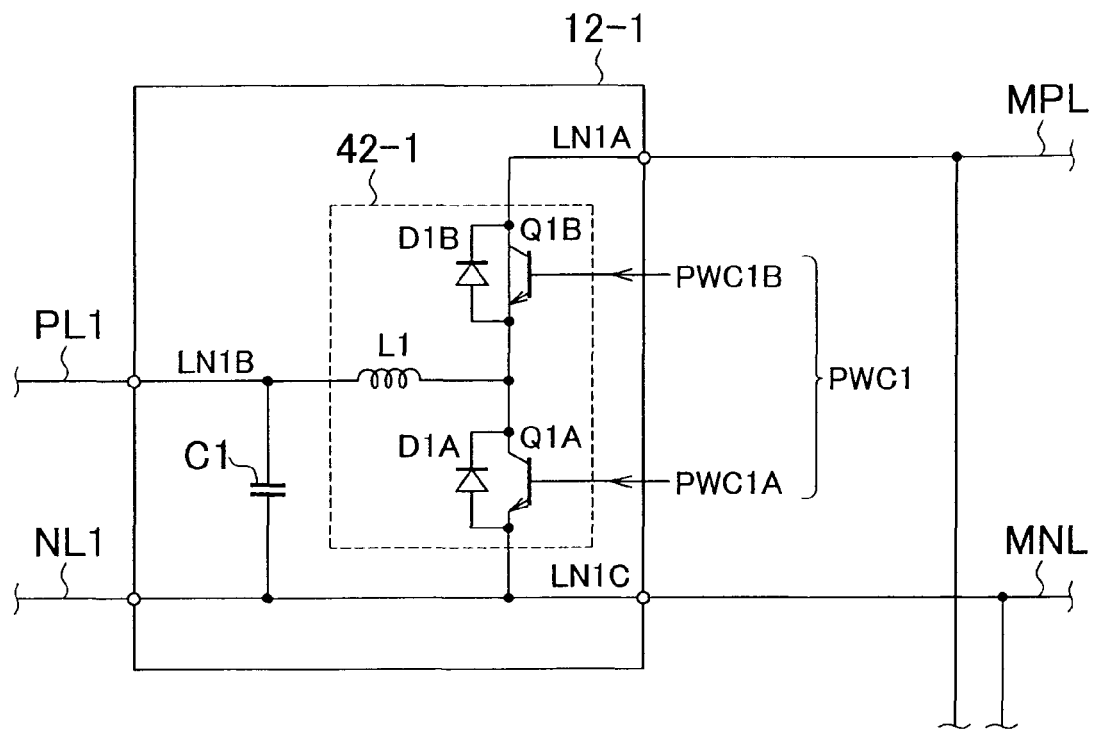
FIG. 2 is a schematic view of a first (or second) converter shown in FIG. 1.

FIG. 2 is a schematic view showing the construction of the first converter 12-1 (or the second converter 12-2) as shown in FIG. 1. Since the construction and operation of the first converter 12-1 are substantially the same as those of the second converter 12-2, the construction and operation of only the first converter 12-1 will be hereinafter described. Referring to FIG. 2, the first converter 12-1 includes a chopper circuit 42-1, positive bus LN1A, negative bus LN1C, line LN1B, and a smoothing capacitor C1. The chopper circuit 42-1 includes switching devices Q1A, Q1B, diodes D1A, D1B, and an inductor L1.

The positive bus LN1A is connected at one end to a collector of the switching device Q1B, and is connected at the other end to the main positive bus MPL. The negative bus LN1C is connected at one end to a negative line NL1, and is connected at the other end to the main negative bus MNL.

The switching devices Q1A, Q1B are connected in series between the negative bus LN1C and the positive bus LN1A. More specifically, an emitter of the switching device Q1A is connected to the negative bus LN1C, and the collector of the switching device Q1B is connected to the positive bus LN1A. The diodes D1A, D1B are connected in reverse parallel with the switching devices Q1A, Q1B, respectively. The inductor L1 is connected between a connecting node of the switching devices Q1A, Q1B and the line LN1B.

The line LN1B is connected at one end to a positive line PL1, and is connected at the other end to the inductor L1. The smoothing capacitor C1 is connected between the line LN1B and the negative bus LN1C, and operates to reduce ac (alternating-current) components contained in a dc voltage between the line LN1B and the negative bus LN1C.

The chopper circuit 42-1 performs bidirectional dc voltage conversion between a voltage across the first storage device 10-1 (FIG. 1) and a voltage between the main positive bus MPL and the main negative bus MNL, according to the drive signal PWC1 from the converter ECU 22 (FIG. 1). The drive signal PWC1 includes a drive signal PWC1A for controlling ON/OFF of the switching device Q1A that provides a lower-arm device, and a drive signal PWC1B for controlling ON/OFF of the switching device Q1B that provides an upper-arm device. With the drive signal PWC1, the converter ECU 22 controls the duty ratio (the ratio between the ON period and the OFF period) of the switching devices Q1A, Q1B within a given duty cycle (the sum of the ON period and the OFF period).

If the switching devices Q1A, Q1B are controlled so that the ON period of the switching device Q1A (relative to the OFF period) increases (in this case, the ON period of the switching device Q1B decreases since the switching devices Q1A, Q1B are complementarily controlled to ON/OFF except their dead-time periods), the amount of pump current flowing from the first storage device 10-1 into the inductor L1 increases, and electromagnetic energy accumulated in the inductor L1 increases. As a result, the amount of current discharged from the inductor L1 to the main positive bus MPL via the diode D1B at a time when the switching device Q1A changes from the ON state to the OFF state increases, and the voltage of the main positive bus MPL rises.

On the other hand, if the switching devices Q1A, Q1B are controlled so that the ON period of the switching device Q1B (relative to the OFF period) increases (in this case, the ON period of the switching device Q1A decreases), the amount of current flowing from the main positive bus MPL to the storage device 10-1 through the switching device Q1B and the inductor L1 increases, and the voltage of the main positive bus MPL drops.

By controlling the duty ratios of the switching devices Q1A, Q1B in the above manner, the voltage of the main positive bus MPL can be controlled, and the direction and amount of current (electric power) that flows between the first storage device 10-1 and the main positive bus MPL can be controlled.

Figure 3:
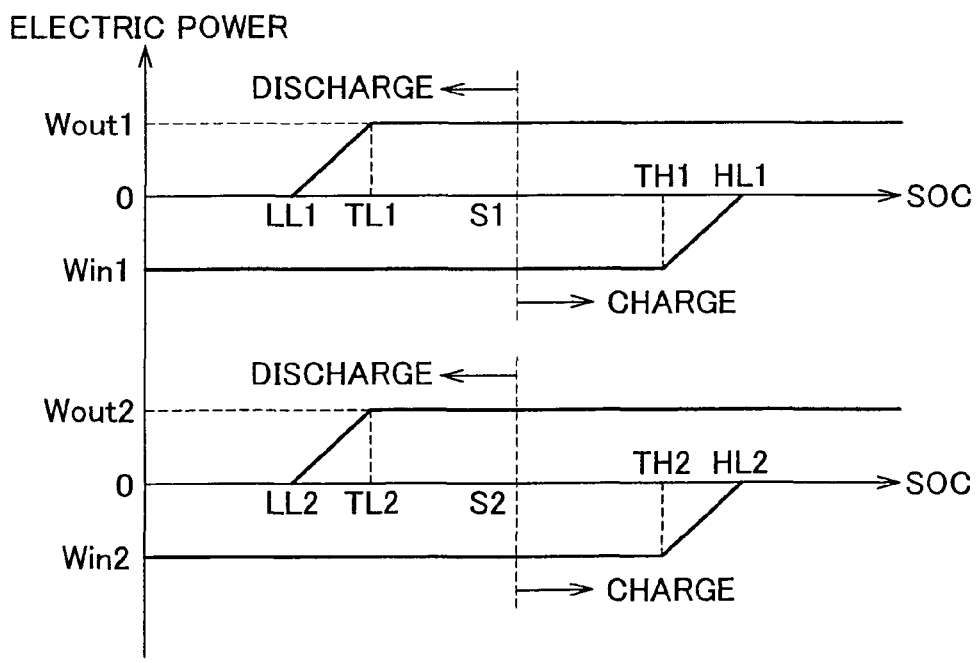
FIG. 3 is a graph useful for explaining permissible electric power for discharge and permissible electric power for charge of storage devices shown in FIG. 1.

FIG. 3 is a graph useful for explaining the permissible electric power for discharge (which will also be called "permissible discharge power") and permissible electric power for charge (which will also be called "permissible charge power") of the storage devices shown in FIG. 1. While the graph of FIG. 3 is concerned with the first storage device 10-1 and the second storage device 10-2, the third storage device 10-3 shows similar characteristics.

Referring to FIG. 3, the permissible discharge power Wout1 is the maximum value of electric power that can be instantaneously generated from the first storage device 10-1, and the permissible discharge power of the first storage device 10-1 is limited, i.e., becomes smaller than Wout1 if the SOC of the first storage device 10-1 becomes lower than the lower limit TL1. The lowest limit LL1 indicates the discharge limit of the first storage device 10-1. The permissible charge power Win1 is the maximum value of electric power that can be instantaneously supplied to the first storage device 10-1, and the permissible charge power of the first storage device 10-1 is limited, i.e., becomes smaller than Win1 if the SOC of the first storage device 10-1 exceeds the upper limit TH1. The uppermost limit HL1 indicates the charge limit of the first storage device 10-1. The above explanation applies to the lower part of the graph regarding the second storage device 10-2, and thus will not be repeated with regard to the second storage device 10-2.

Referring to FIG. 3, the basic concept of power distribution control according to this embodiment of the invention will be explained. Suppose the power supply system 1 includes only two storage devices, i.e., the first storage device 10-1 and the second storage device 10-2. The SOCs of the first storage device 10-1 and second storage device 10-2 are denoted by S1, S2, respectively, and the operation of the power supply system 1 in the discharge mode will be considered.

Supposing electric power is equally discharged from the first storage device 10-1 and the second storage device 10-2 (which means that electric power discharged from the first storage device 10-1 is equivalent to that discharged from the second storage device 10-2), the permissible discharge power of one of the first storage device 10-1 and the second storage device 10-2 is limited (i.e., becomes smaller that the maximum value) earlier than that of the other storage device. Thereafter, the discharging capability of the power supply system 1 as a whole, which is the sum of the discharging capabilities of the first storage device 10-1 and second storage device 10-2, is reduced even though the discharging capability of the other storage device is still sufficiently high.

In view of the above situation, if the distribution of the discharge power is performed so that the SOCs of the first storage device 10-1 and the second storage device 10-2 reach the lower limits TL1, TL2, respectively, at the same time, the chance that (a period of time for which) the power supply system 1 as a whole exhibits the maximum discharging capability can be maximized.

In fact, in this embodiment, the second storage device 10-2 and the third storage device 10-3 are alternately selected by the switching device 18 and used. In this embodiment, therefore, the second storage device 10-2 and the third storage device 10-3 that are alternately selected for use by the switching device 18 are regarded as a single storage device, and discharge control is performed so that the SOCs of the first storage device 10-1 and a storage unit that consists of the second storage device 10-2 and the third storage device 10-3 reach the respective lower limits at the same time.

Next, the operation of the power supply system 1 in the charge mode will be considered. Supposing the first storage device 10-1 and the second storage device 10-2 are equally charged (which means that electric power supplied for charging the first storage device 10-1 is equivalent to that supplied for charging the second storage device 10-2), the permissible charge power of one of the first storage device 10-1 and the second storage device 10-2 is limited (i.e., becomes smaller that the maximum value) earlier than that of the other storage device. Thereafter, the charging capability of the power supply system 1 as a whole, which is the sum of the charging capabilities of the first storage device 10-1 and the second storage device 10-2, is reduced even though the charging capability of the other storage device is still sufficiently high.

In view of the above situation, if the distribution of electric power for charge is performed so that the SOCs of the first storage device 10-1 and the second storage device 10-2 reach the upper limits TH1, TH2, respectively, at the same time, the chance that (a period of time for which) the power supply system 1 as a whole exhibits the maximum charging capability can be maximized.

In fact, in this embodiment, the second storage device 10-2 and the third storage device 10-3 are alternately selected by the switching device 18 and used. In this embodiment, therefore, charge control is performed so that the SOCs of the first storage device 10-1 and the storage device connected to the second converter 12-2 via the switching device 18 reach the respective upper limits at the same time.

Figure 4:
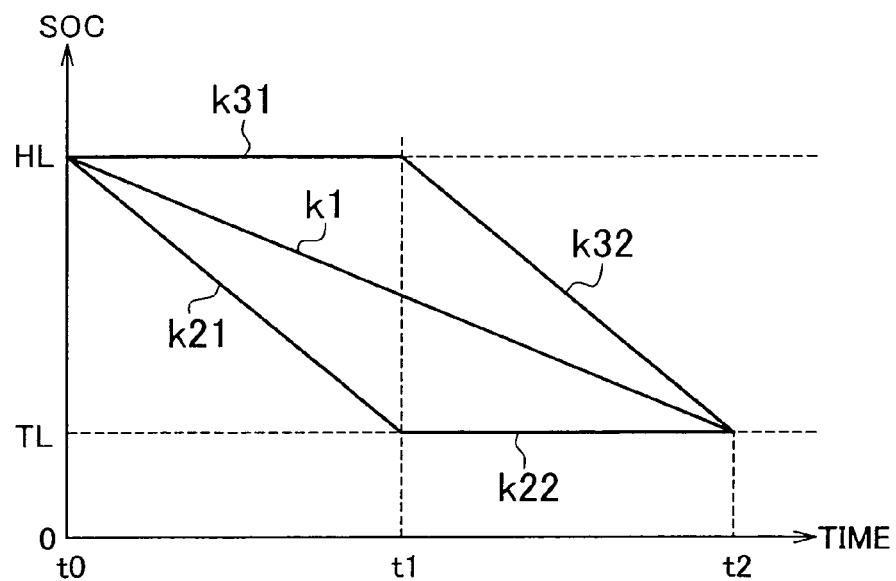
FIG. 4 is a graph useful for explaining how to use each storage device.

FIG. 4 is a graph useful for explaining how to use each storage device. In the example of FIG. 4, the upper limit and lower limit of the SOC of each storage device are supposed to be equal. FIG. 4 illustrates the case where each storage device, which is in a fully charged status and whose SOC is equal to the uppermost value HL, is discharged until the SOC becomes equal to the lower limit TL.

Referring to FIG. 4, line k1 indicates changes in the SOC of the first storage device 10-1. Lines k21, k22 indicate changes in the SOC of the second storage device 10-2. Lines k31, k32 indicate changes in the SOC of the third storage device 10-3.

In the example of FIG. 4, the second storage device 10-2 is selected by the switching device 18 and used, ahead of the third storage device 10-3. During a period from time t0 to t1, electric power is discharged from the first storage device 10-1 and the second storage device 10-2. When the SOC of the second storage device 10-2 reaches the lower limit TL at time t1, the switching device 18 switches the storage device connected to the second converter 12-2 from the second storage device 10-2 to the third storage device 10-3. Thereafter, electric power is discharged from the first storage device 10-1 and the third storage device 10-3, and the SOCs of the first storage device 10-1 and the third storage device 10-3 reach the lower limit TL at time t2.

Figure 5:
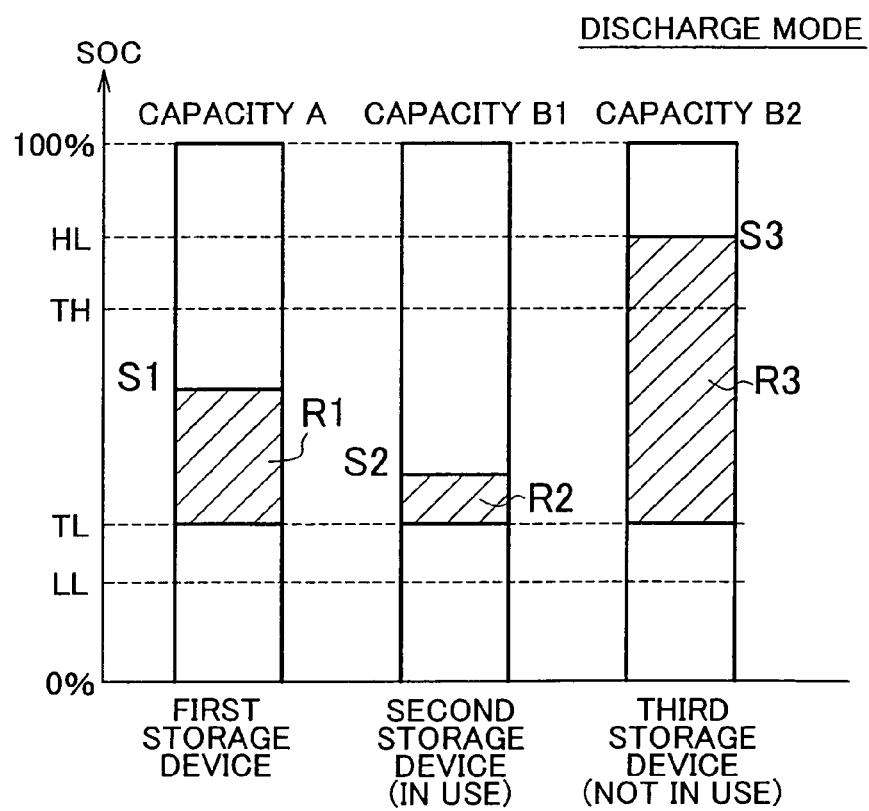
FIG. 5 is a graph useful for explaining a method of calculating a discharge distribution ratio.

FIG. 5 is a graph useful for explaining a method of calculating the discharge distribution ratio. For the sake of easier understanding, the lower limit TL indicating the SOC at which the permissible discharge power becomes smaller than the maximum value Wout, and the lowermost value LL indicating the discharge limit of the storage device, are set to the same values for each storage device.

Referring to FIG. 5, with regard to the first storage device 10-1, the amount R1 of electric power that is allowed to be discharged from the first storage device 10-1 until the SOC reaches the lower limit TL at which the permissible discharge power becomes smaller than Wout1 is calculated according to the following expression.

$$R1=A(S1-TL) \quad (1)$$

where A indicates the storage capacity of the first storage device 10-1, and S1 indicates the SOC of the first storage device 10-1 measured at the time of calculation.

Similarly, the amount R2 of electric power that is allowed to be discharged from the second storage device 10-2 until the SOC reaches the lower limit TL, and the amount R3 of electric power that is allowed to be discharged from the third storage device 10-3 until the SOC reaches the lower limit TL, are calculated according to the following expressions.

$$R2=B1(S2-TL) \quad (2)$$

$$R3=B2(S3-TL) \quad (3)$$

where B1, B2 indicate the storage capacities of the second storage device 10-2 and the third storage device 10-3, respectively, and S2, S3 indicate the SOCs of the second storage device 10-2 and the third storage device 10-3 measured at the time of calculation.

In the discharge mode, the first converter 12-1 and the second converter 12-2 are controlled so that the discharge distribution ratio of the first storage device 10-1 and the second storage device 10-2 (or third storage device 10-3) becomes equal to R1:(R2+R3).

Figure 6:
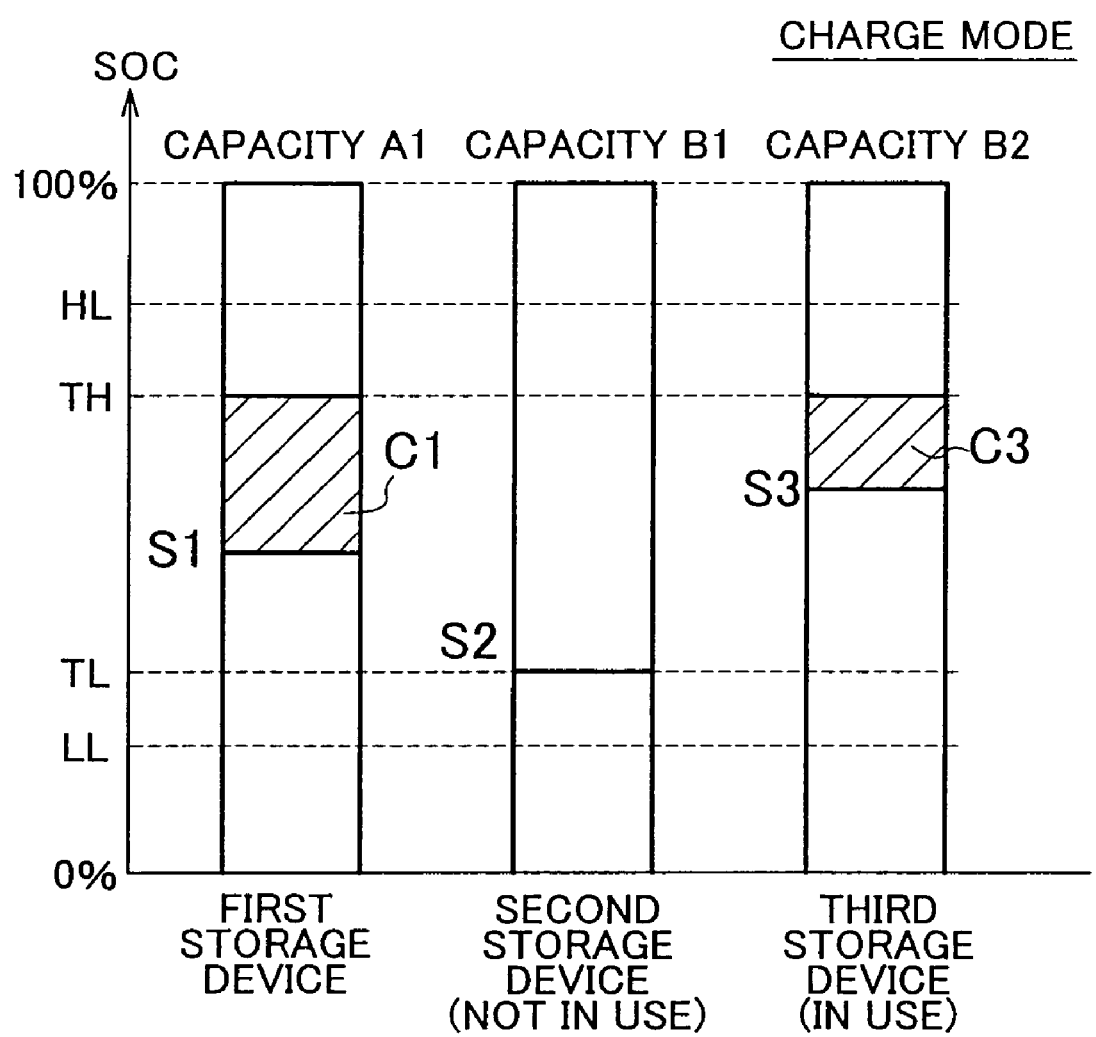
FIG. 6 is a graph useful for explaining a method of calculating a charge distribution ratio.

FIG. 6 is a graph useful for explaining a method of calculating the charge distribution ratio. FIG. 6 illustrates the case where the third storage device 10-3 is electrically connected to the second converter 12-2 by the switching device 18. For the sake of easier understanding, the upper limit TH indicating the SOC at which the permissible charge power becomes smaller than the maximum value Win, and the uppermost value HL indicating the charge limit of the storage device, are set to the same values for each storage device.

Referring to FIG. 6, with regard to the first storage device 10-1, the amount C1 of electric power with which the first storage device 10-1 is allowed to be charged until the SOC reaches the upper limit TH at which the permissible charge power becomes smaller than Win1 is calculated according to the following expression.

$$C1=A(TH-S1) \quad (4)$$

Similarly, with regard to the third storage device 10 that is currently used, the amount C3 of electric power with which the third storage device 10-3 is allowed to be charged until the SOC reaches the upper limit TH is calculated according to the following expression (equation).

$$C3=B2(TH-S3) \quad (5)$$

Then, in the charge mode, the first converter 12-1 and the second converter 12-2 are controlled so that the charge distribution ratio of the first storage device 10-1 and the third storage device 10-3 becomes equal to C1:C3.

While the method of calculating the charge distribution ratio in the case where the third storage device 10-3 is electrically connected to the second converter 12-2 has been explained above, the charge distribution ratio in the case where the second storage device 10-2 is electrically connected to the second converter 12-2 can be calculated in the same manner.

Namely, with regard to the second storage device 10-2 that is currently used, the amount C2 of electric power with which the second storage device 10-2 is allowed to be charged until the SOC reaches the upper limit TH is calculated according to the following expression.

$$C2=B1(TH-S2) \quad (6)$$

Then, in the charge mode, the first converter 12-1 and the second converter 12-2 are controlled so that the charge distribution ratio of the first storage device 10-1 and the second storage device 10-2 becomes equal to C1:C2.

Figure 7:
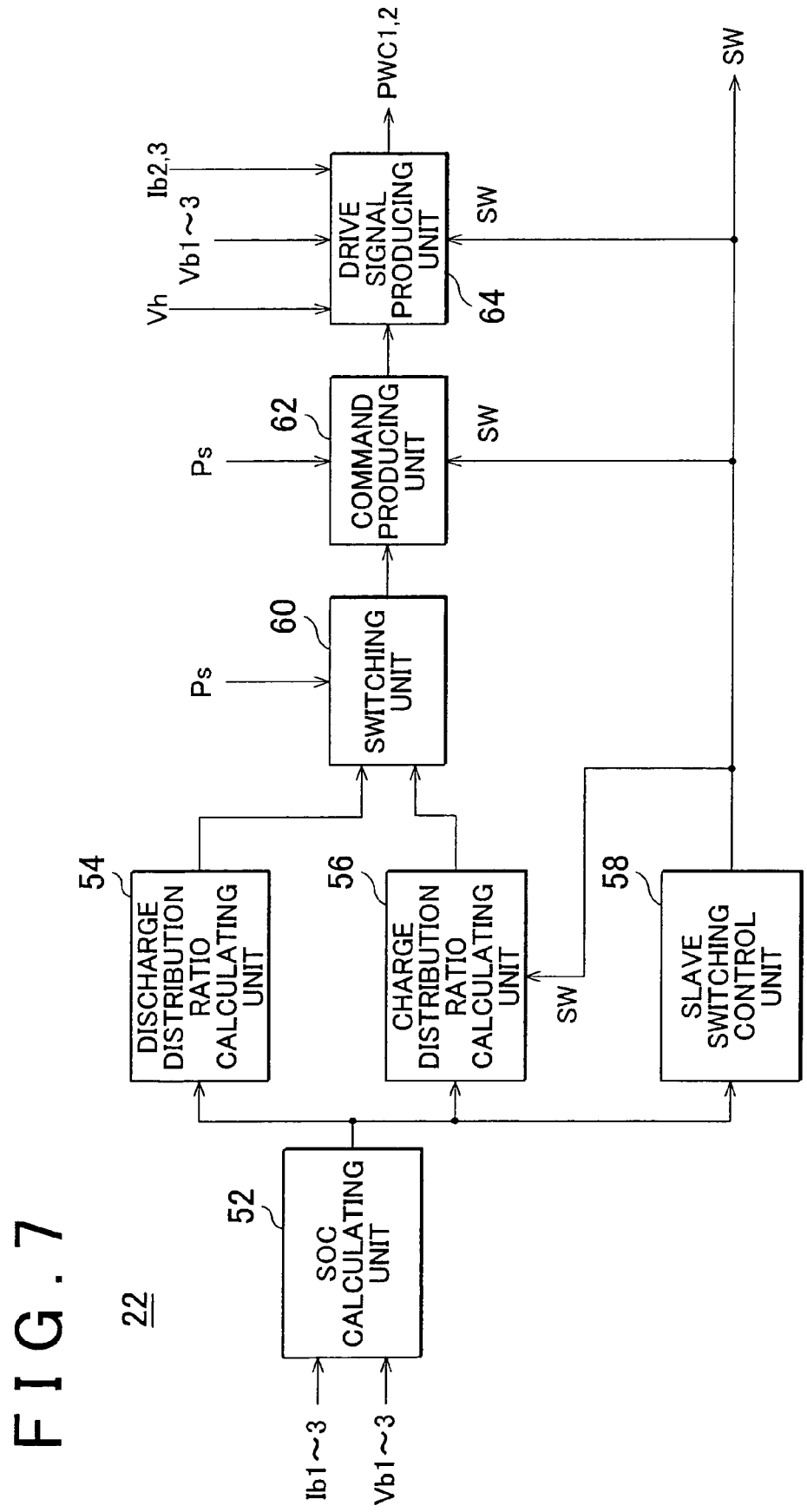
FIG. 7 is a functional block diagram of a converter ECU shown in FIG. 1.

FIG. 7 is a functional block diagram of the converter ECU 22 shown in FIG. 1. Referring to FIG. 7, the converter ECU 22 includes a SOC calculating unit 52, discharge distribution ratio calculating unit 54, charge distribution ratio calculating unit 56, slave switching control unit 58, switching unit 60, command producing unit 62, and a drive signal producing unit 64.

The SOC calculating unit 52 calculates the quantity of state S1 indicative of the SOC of the first storage device 10-1, based on detection values of current Ib1 and voltage Vb1. Also, the SOC calculating unit 52 calculates the quantity of state S2 indicative of the SOC of the second storage device 10-2, based on detection values of current Ib2 and voltage Vb2. Furthermore, the SOC calculating unit 52 calculates the quantity of state S3 indicative of the SOC of the third storage device 10-3, based on detection values of current Ib3 and voltage Vb3. Various known methods may be used as a method of calculating the SOC.

The discharge distribution ratio calculating unit 54 calculates the amounts R1–R3 of electric power allowed to be discharged, according to the above-indicated expressions (1)-(3), based on the quantities of state S1–S3 calculated by the SOC calculating unit 52. Then, the discharge distribution ratio calculating unit 54 calculates the discharge distribution ratio R1:(R2+R3), based on the calculated amounts R1–R3 of electric power allowed to discharged, and sends the result of the calculation to the switching unit 60.

When the switching signal SW received from the slave switching control unit 58 (which will be described later) is deactivated, namely, when the second storage device 10-2 is being used, the charge distribution ratio calculating unit 56 calculates the amounts C1, C2 of electric power with which the storage devices 10-1, 10-2 are allowed to be charged, using the above-indicated expressions (4), (6), based on the quantities of state S1, S2 calculated by the SOC calculating unit 52. Then, the charge distribution ratio calculating unit 56 calculates the charge distribution ratio C1:C2, based on the calculated amounts C1, C2 of electric power, and sends the result of the calculation to the switching unit 60.

When the switching signal SW is activated, namely, when the third storage device 10-3 is being used, the charge distribution ratio calculating unit 56 calculates the amounts C1, C3 of electric power with which the storage devices 10-1, 10-3 are allowed to be charged, using the above-indicated expressions (4), (5), based on the quantities of state S1, S3 calculated by the SOC calculating unit 52. Then, the charge distribution ratio calculating unit 56 calculates the charge distribution ratio C1:C3, based on the calculated amounts C1, C3 of electric power, and sends the result of the calculation to the switching unit 60.

The slave switching control unit 58 produces the switching signal SW used for alternately selecting the second storage device 10-2 and third storage device 10-3 connected to the switching device 18 for use, based on the quantities of state S2, S3 calculated by the SOC calculating unit 52. For example, when the quantity of state S2 is larger than the lower limit TL, the slave switching control unit 58 deactivates the switching signal SW so that the second storage device 10-2 is electrically connected to the second converter 12-2. When the quantity of state S2 reaches the lower limit TL, the slave switching control unit 58 activates the switching signal SW so that the third storage device 10-3 is electrically connected to the second converter 12-2.

The switching signal SW is transmitted to the switching device 18, and is also transmitted to the charge distribution ratio calculating unit 56, and the command producing unit 62 and drive signal producing unit 64 (which will be described later).

When the vehicle required power Ps received from the MG-ECU 40 of the driving force generating unit 2 is a positive value, namely, when the power supply system 1 operates in a discharge mode, the switching unit 60 sends the discharge distribution ratio received from the discharge distribution ratio calculating unit 54, to the command producing unit 62. On the other hand, when the vehicle required power Ps is a negative value, namely, when the power supply system 1 operates in a charge mode, the switching unit 60 sends the charge distribution ratio received from the charge distribution ratio calculating unit 56 to the command producing unit 62.

When the vehicle required power Ps is a positive value (i.e., in the discharge mode), the command producing unit 62 calculates a target electric power PR indicative of electric power to be discharged from the storage device electrically connected to the second converter 12-2, according to the following expression.

$$PR=Ps \times (R2+R3)/(R1+R2+R3) \qquad (7)$$

On the other hand, when the vehicle required power Ps is a negative value (i.e., in the charge mode), and the switching signal SW from the slave switching control unit 58 is deactivated (namely, the second storage device 10-2 is currently used), the command producing unit 62 calculates a target electric power PR indicative of electric power to be supplied for charging the second storage device 10-2 electrically connected to the second converter 12-2, based on the charge distribution ratio received from the switching unit 60.

$$PR=Ps \times C2/(C1+C2) \qquad (8)$$

Also, when the vehicle required power Ps is a negative value (i.e., in the charge mode), and the switching signal SW is activated (namely, the third storage device 10-3 is currently used), the command producing unit 62 calculates a target electric power PR indicative of electric power to be supplied for charging the third storage device 10-3 electrically connected to the second converter 12-2, based on the charge distribution ratio received from the switching unit 60.

$$PR=Ps \times C3/(C1+C3) \qquad (9)$$

Furthermore, the command producing unit 62 sets a target voltage VR of the voltage Vh. For example, the command producing unit 62 sets a certain value that is higher than the maximum value of the voltages Vb1–Vb3, as the target voltage VR.

The drive signal producing unit 64 produces drive signals PWC1, PWC2 for driving the first converter 12-1 and the second converter 12-2, respectively, according to a method that will be described later, based on detection values of voltages Vh, Vb1-Vb3 and currents Ib2, Ib3, the target voltage VR and target power PR received from the command producing unit 62, and the switching signal SW received from the slave switching control unit 58. Then, the drive signal producing unit 64 sends the produced drive signals PWC1, PWC2 to the first converter 12-1 and the second converter 12-2, respectively.

Figure 8:
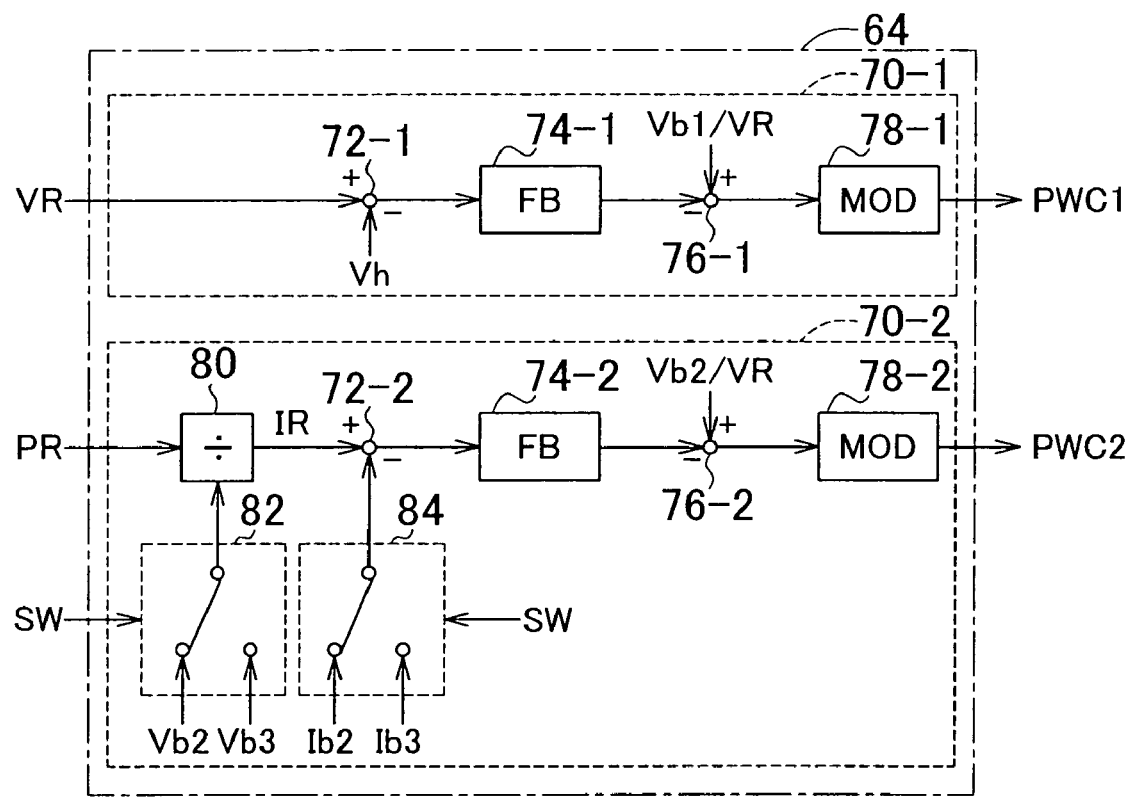
FIG. 8 is a detailed, functional block diagram of a drive signal producing unit shown in FIG. 7.

FIG. 8 is a detailed, functional block diagram of the drive signal producing unit 64 shown in FIG. 7. Referring to FIG. 8, the drive signal producing unit 64 includes a first control unit 70-1 and a second control unit 70-2. The first control unit 70-1 includes subtracting units 72-1, 76-1, feedback (FB) control unit 74-1, and a modulating unit 78-1.

The subtracting unit 72-1 subtracts a detection value of voltage Vh from the target voltage VR, and sends the result of the calculation to the FB control unit 74-1. The FB control unit 74-1 calculates a FB compensation amount based on the output of the subtracting unit 72-1, and sends the result of the calculation to the subtracting unit 76-1. For example, the FB control unit 74-1 performs a proportional plus integral operation, based on the output of the subtracting unit 72-1, and sends the result of the operation to the subtracting unit 76-1.

The subtracting unit 76-1 subtracts the output of the FB control unit 74-1, from the inverse of the theoretical step-up ratio of the first converter 12-1 represented by the ratio of voltage Vb1 to the target voltage VR (Vb1/VR), and sends the result of the calculation in the form of a duty command to the modulating unit 78-1. In this connection, the input term (voltage Vb1/target voltage VR) of the subtracting unit 76-1 is a feed-forward (FF) compensation term based on the theoretical step-up ratio of the first converter 12-1.

The modulating unit 78-1 produces a drive signal PWC1, based on the duty command received from the subtracting unit 76-1, and a carrier wave produced by an oscillator (not shown), and sends the produced drive signal PWC1 to the first converter 12-1.

The second control unit 70-2 includes subtracting units 72-2, 76-2, FB control unit 74-2, modulating unit 78-2, dividing unit 80, and change-over switches 82, 84.

When the switching signal SW from the slave switching control unit 58 (FIG. 7) is deactivated (i.e., the second storage device 10-2 is currently used), the change-over switch 82 sends a detection value of voltage Vb2 to the dividing unit 80. On the other hand, when the switching signal SW is activated (i.e., the third storage device 10-3 is currently used), the change-over switch 82 sends a detection value of voltage Vb3 to the dividing unit 80. Then, the dividing unit 80 divides the target electric power PR by the output of the change-over switch 82, and sends the result of the calculation as a target current IR to the subtracting unit 72-2.

When the switching signal SW is deactivated, the change-over switch 84 sends a detection value of current Ib2 to the subtracting unit 72-2. On the other hand, when the switching signal SW is activated, the change-over switch 84 sends a detection value of current Ib3 to the subtracting unit 72-2. Then, the subtracting unit 72-2 subtracts the output of the change-over switch 84 from the target current IR, and sends the result of the calculation to the FB control unit 74-2. The FB control unit 74-2 calculates a FB compensation amount based on the output of the subtracting unit 72-2, and sends the result of the calculation to the subtracting unit 76-2. For example, the FB control unit 74-2 performs a proportional plus integral operation based on the output of the subtracting unit 72-2, and sends the result of the operation to the subtracting unit 76-2.

The subtracting unit 76-2 subtracts the output of the FB control unit 74-2 from the inverse of the theoretical step-up ratio of the second converter 12-2 represented by the ratio of voltage Vb2 to the target voltage VR (Vb2/VR), and sends the result of the calculation in the form of a duty command to the modulating unit 78-2. In this connection, the input term (voltage Vb2/target voltage VR) of the subtracting unit 76-2 is a feed-forward (FF) compensation term based on the theoretical step-up ratio of the second converter 12-2.

The modulating unit 78-2 produces a drive signal PWC2, based on the duty command received from the subtracting unit 76-2, and a carrier wave produced by an oscillator (not shown), and sends the produced drive signal PWC2 to the second converter 12-2.

Figure 9:
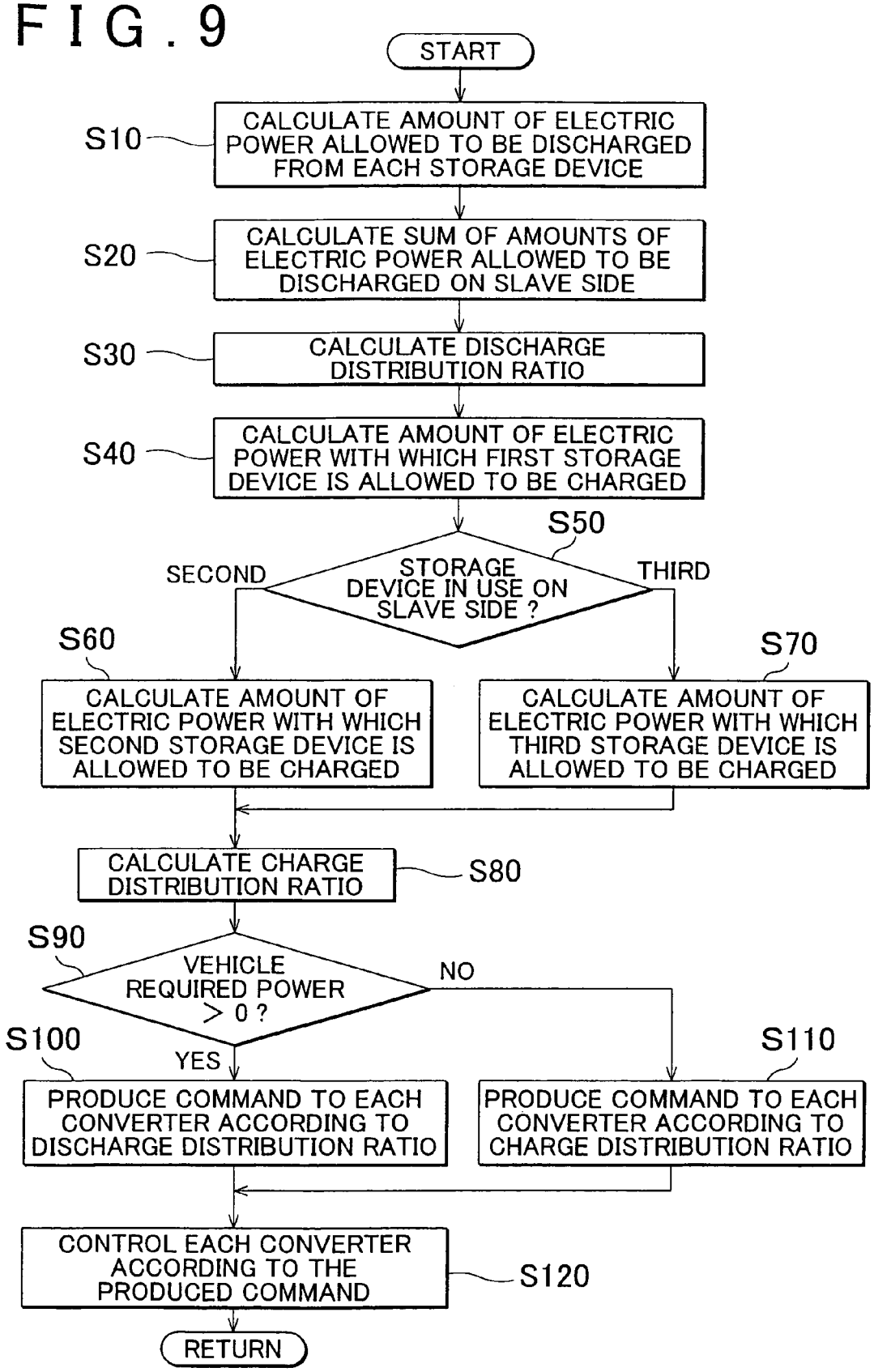
FIG. 9 is a flowchart useful for explaining the control scheme of the converter ECU shown in FIG. 1.

FIG. 9 is a flowchart useful for explaining the control scheme of the converter ECU 22 shown in FIG. 1. The routine of this flowchart is called for from a main routine and executed at given time intervals or each time a given condition or conditions is/are satisfied.

Referring to FIG. 9, the converter ECU 22 calculates the amount R1 of electric power allowed to be discharged from the first storage device 10-1, the amount R2 of electric power allowed to be discharged from the second storage device 10-2, and the amount R3 of electric power allowed to be discharged from the third storage device 10-3, according to the above-indicated expressions (1) to (3) (step S10). Then, the converter ECU 22 calculates the sum of the amounts R2, R3 of electric power allowed to be discharged on the slave side (step S20). Then, the converter ECU 22 calculates the discharge distribution ratio R1:(R2+R3), based on the calculation results obtained in steps S10, S20 (step S30).

Subsequently, the converter ECU 22 calculates the amount C1 of electric power C1 with which the first storage device 10-1 is allowed to be charged, according to the above-indicated expression (4) (step S40). Then, the converter ECU 22 determines whether the storage device that is currently electrically connected to the second converter 12-2 via the switching device 18 on the slave side is the second storage device 10-2 or the third storage device 10-3 (step S50).

If it is determined that the second storage device 10-2 is electrically connected to the second converter 12-2 (if "SECOND" is determined in step S50), the converter ECU 22 calculates the amount C2 of electric power with which the second storage device 10-2 is allowed to be charged, according to the above-indicated expression (6) (step S60). If, on the other hand, it is determined in step S50 that the third storage device 10-3 is electrically connected to the second converter 12-2 (if "THIRD" is determined in step S50), the converter ECU 22 calculates the amount C3 of electric power with which the third storage device 10-3 is allowed to be charged, according to the above-indicated expression (5) (step S70).

When the second storage device 10-2 is electrically connected to the second converter 12-2, the converter ECU 22 calculates the charge distribution ratio C1:C2, based on the calculated amounts C1, C2 of electric power. When the third storage device 10-3 is electrically connected to the second converter 12-2, on the other hand, the converter ECU 22 calculates the charge distribution ratio C1:C3, based on the calculated amounts C1, C3 of electric power.

Subsequently, the converter ECU 22 determines whether the vehicle required power Ps received from the MG-ECU 40 of the driving force generating unit 2 is a positive value (step S90). If it is determined that the vehicle required power Ps is a positive value (i.e., if an affirmative decision (YES) is made in step S90), the converter ECU 22 produces the drive signals PWC1, PWC2 for driving the first converter 12-1 and the second converter 12-2, respectively, by the method as described above, according to the discharge distribution ratio calculated in step S30 (step S100).

If, on the other hand, it is determined in step S90 that the vehicle required power Ps is not a positive value (i.e., if a negative decision (NO) is made in step S90), the converter ECU 22 produces the drive signals PWC1, PWC2, according to the charge distribution ratio calculated in step S80 (step S110).

Then, the converter ECU 22 sends the drive signals PWC1, PWC2 produced in step S100 or step S110 to the first converter 12-1 and the second converter 12-2, respectively, so as to control the first converter 12-1 and the second converter 12-2 (step S120).

As described above, in this embodiment, when the power supply system 1 operates in a discharge mode, the discharge distribution ratio is calculated according to the ratio between the amount R1 of electric power allowed to be discharged from the first storage device 10-1, and the sum of the amounts R2, R3 of electric power allowed to be discharged from the second storage device 10-2 and the third storage device 10-3, and the first converter 12-1 and the second converter 12-2 are controlled according to the calculated discharge distribution ratio. With this arrangement, one of the first storage device 10-1 and the second and third storage devices 10-2, 10-3 that are alternately selected and used is less likely or unlikely to reach the discharge limit at an earlier time than the other storage device.

When the power supply system 1 operates in a charge mode, on the other hand, the charge distribution ratio is calculated according to the ratio of the amount C1 of electric power with which the first storage device 10-1 is allowed to be charged, and the amount (C2 or C3) of electric power with which the storage device electrically connected to the second converter 12-2 is allowed to be charged, and the first converter 12-1 and the second converter 12-2 are controlled according to the calculated charge distribution ratio. With this arrangement, one of the first storage device 10-1 and the storage device 10-2 or 10-2 that is currently used on the slave side is less likely or unlikely to reach the charge limit at earlier time than the other storage device.

Also, the discharge distribution ratio is calculated in the discharge mode, using the sum of the amounts R2, R3 of electric power allowed to be discharged from the second storage device 10-2 and the third storage device 10-3, whereas the charge distribution ratio is calculated in the charge mode, using the amount (C2 or C3) of electric power with which the storage device in use that is electrically connected to the second converter 12-2 is allowed to be charged, so that the charge distribution ratio for the storage device in use electrically connected to the second converter 12-2 is prevented from being higher than necessary.

Thus, the power supply system 1 of this embodiment having a plurality of storage devices provides sufficient charging and discharging characteristics, and is also able to prevent the storage device electrically connected to the second converter 12-2 from being overcharged.

In the embodiment as described above, the SOC of the second storage device 10-2 to which the storage device is switched on the slave side, and the SOC based on which the amount of electric power allowed to be discharged is calculated are the same value (the lower limit TL). However, these SOCs may be different values.

While the second storage device 10-2 is used ahead of the third storage device 10-3, as the storage device on the slave side, in the embodiment as described above, the third storage device 10-3 may be used ahead of the second storage device 10-2. In another example, the storage device that is first used may be changed each time the vehicle system is started.

Also, in the embodiment as described above, the target current IR for the second converter 12-2 is calculated from the target electric power PR, and the current FB control is performed on the second converter 12-2, based on a difference between the calculated target current IR and the detection value of the current sensor. However, electric power that is actually supplied to and discharged from the storage device that is currently used on the slave side may be calculated, and power FB control may be performed based on a difference between the target electric power PR and the calculated electric power.

Also, while the voltage FB control is performed on the first converter 12-1, and the current FB control (the power FB control is also possible) is performed on the second converter 12-2, in the embodiment as described above, current FB control (or power FB control) may be performed on the first converter 12-1, and voltage FB control may be performed on the second converter 12-2.

While two storage devices are provided on the slave side in the embodiment as described above, three or more storage devices may be provided on the slave side.

While the driving force generating unit 2 includes the first MG 32-1 and the second MG 32-2 in the embodiment as described above, the number of MGs included in the driving force generating unit 2 is not limited to two.

While the hybrid vehicle as described above is of a series/parallel type capable of splitting the power of the engine 36 by means of the power divider 34 and transmitting the power to the driving wheels 38 and the first MG 32-1, this invention may also be applied to other types of hybrid vehicles. For example, this invention may be applied to a so-called series type hybrid vehicle, which uses the engine 36 exclusively for driving the first MG 32-1, and uses only the second MG 32-2 for generating the driving force of the vehicle, or a hybrid vehicle in which only the regenerative energy, out of the kinetic energy produced by the engine 36, is collected as electric energy, or a motor-assist type hybrid vehicle in which the engine is used as a main power source, with the aid of a motor as needed.

Also, this invention may be applied to an electric vehicle that is not provided with the engine 36 and runs only with electric power, or a fuel cell car provided with a fuel cell system in addition to storage devices, as power sources.

In the embodiment as described above, the main positive bus MPL and the main negative bus MNL correspond to one example of "power line" according to this invention, and the first converter 12-1 and the second converter 12-2 correspond to respective examples of "first converter" and "second converter" according to this invention. Also, the first storage device 10-1 corresponds to one example of "first storage device" according to this invention, and the second storage device 10-2 and third storage device 10-3 correspond to one example of "a plurality of second storage devices" according to this invention.

Furthermore, the converter ECU 22 corresponds to one example of "control device" according to this invention, and the slave switching control unit 58 corresponds to one example of "switching control unit" according to this invention. Also, the switching unit 60, command producing unit 62 and the drive signal producing unit 64 provide one example of "converter control unit" according to this invention, and the system relays RY1, RY2 correspond to one example of "a plurality of relays" according to this invention.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A power supply system capable of supplying and receiving electric power to and from a load device, comprising:
  a power line through which electric power is supplied and received between the power supply system and the load device;
  first converter and second converter connected in parallel with each other to the power line;
  a first storage device that is rechargeable and is connected to the first converter;
  a plurality of second storage devices that are rechargeable;
  a switching device provided between said plurality of second storage devices and the second converter and capable of connecting one of said plurality of second storage devices to the second converter according to a given command; and a control device that controls the first and second converters and the switching device, wherein:

the control device comprises:

a switching control unit that produces the command for selecting a storage device to be used from said plurality of second storage devices in sequence, and sends the command to the switching device, so that, when a quantity of state indicative of a state of charge of the second storage device connected to the second converter becomes smaller than a specified value, a remaining one of the second storage devices, whose quantity of state is not smaller than the specified value, is connected to the second converter;

a discharge distribution ratio calculating unit that calculates a discharge distribution ratio indicative of a proportion between electric power discharged from the first storage device and electric power discharged from the second storage device connected to the second converter by the switching device;

a charge distribution ratio calculating unit that calculates a charge distribution ratio indicative of a proportion between electric power supplied for charging the first storage device and electric power supplied for charging the second storage device connected to the second converter by the switching device; and a converter control unit that controls the first and second converters according to the discharge distribution ratio, in a discharge mode in which electric power is supplied from the power supply system to the load device, and controls the first and second converters according to the charge distribution ratio, in a charge mode in which electric power is supplied from the load device to the power supply system; wherein the discharge distribution ratio calculating unit calculates an amount of electric power that is allowed to be discharged from each of the first storage device and said plurality of second storage devices, and calculates the discharge distribution ratio, according to a ratio between the amount of electric power allowed to be discharged from the first storage device, and a sum of the amounts of electric power allowed to be discharged from said plurality of second storage devices; and wherein the charge distribution ratio calculating unit calculates an amount of electric power with which each of the first storage device and the second storage device connected to the second converter is allowed to be charged, and calculates the charge distribution ratio, according to a ratio between the amount of electric power with which the first storage device is allowed to be charged, and the amount of electric power with which the second storage device connected to the second converter is allowed to be charged.

2. The power supply system according to claim 1, wherein:

electric power that can be supplied from each of the first storage device and said plurality of second storage devices is limited when the quantity of state of the corresponding storage device becomes smaller than a specified lower limit; and electric power that can be supplied to each of the first storage device and said plurality of second storage devices is limited when the quantity of state of the corresponding storage device exceeds a specified upper limit.

3. The power supply system according to claim 2, wherein:

the discharge distribution ratio calculating unit calculates the amount of electric power that is allowed to be discharged from each of the first storage device and said plurality of second storage devices, based on a value obtained by subtracting said lower limit from the quantity of state indicative of the current state of charge of the corresponding storage device, and a storage capacity of the corresponding storage device; and the charge distribution ratio calculating unit calculates the amount of electric power with which each of the first storage device and the second storage device connected to the second storage device is allowed to be charged, based on a value obtained by subtracting the quantity of state indicative of the current state of charge of the corresponding storage device from said upper limit, and the storage capacity of the corresponding storage device.

4. The power supply system according to claim 1, wherein the converter control unit comprises:

a first control unit that controls the first converter so as to regulate a voltage of the power line to a given target voltage;

a second control unit that controls the second converter so as to control charge and discharge of the second storage device connected to the second converter, to given target amounts.

5. The power supply system according to claim 1, wherein the switching device includes a plurality of relays each connected between each of said plurality of second storage devices and the second converter.

6. The power supply system according to claim 1, wherein the control device controls discharge of each of the first storage device and said plurality of second storage devices so that the quantities of state of the storage devices reach a specified lower limit at the same time, and controls charge of each of the first storage device and said plurality of second storage devices so that the quantities of state of the storage devices reach a specified upper limit at the same time.

7. A vehicle, comprising:

the power supply system as defined in claim 1; and a driving force generating unit that receives electric power from the power supply system and generates driving force of the vehicle.

8. A control method of a power supply system capable of supplying and receiving electric power to and from a load device, said power supply system comprising:

a power line through which electric power is supplied and received between the power supply system and the load device, and first converter and second converter connected in parallel with each other to the power line;

a first storage device that is rechargeable and is connected to the first converter, and a plurality of second storage devices that are rechargeable; and a switching device provided between said plurality of second storage devices and the second converter and capable of connecting one of said plurality of second storage devices to the second converter, wherein the control method comprises the steps of:

controlling the switching device so that, when a quantity of state indicative of a state of charge of the second storage device connected to the second converter becomes smaller than a specified value, a remaining one of the second storage devices, whose quantity of state is not smaller than the specified value, is connected to the second converter;

calculating a discharge distribution ratio indicative of a proportion between electric power discharged from the first storage device and electric power discharged from the second storage device connected to the second converter by the switching device;

calculating a charge distribution ratio indicative of a proportion between electric power supplied for charging the first storage device and electric power supplied for charging the second storage device connected to the second converter by the switching device; and controlling the first and second converters according to the discharge distribution ratio, in a discharge mode in which electric power is supplied from the power supply system to the load device, and controlling the first and second converters according to the charge distribution ratio, in a charge mode in which electric power is supplied from the load device to the power supply system, the step of calculating the discharge distribution ratio comprising:

calculating an amount of electric power that is allowed to be discharged from each of the first storage device and said plurality of second storage devices; and calculating the discharge distribution ratio, according to a ratio between the amount of electric power allowed to be discharged from the first storage device, and a sum of the amounts of electric power allowed to be discharged from said plurality of second storage devices, the step of calculating the charge distribution ratio comprising:

calculating an amount of electric power with which each of the first storage device and the second storage device connected to the second converter is allowed to be charged; and calculating the charge distribution ratio, according to a ratio between the amount of electric power with which the first storage device is allowed to be charged, and the amount of electric power with which the second storage device connected to the second converter is allowed to be charged.

9. The control method of the power supply system according to claim 8, wherein:

electric power that can be supplied from each of the first storage device and said plurality of second storage devices is limited when the quantity of state of the corresponding storage device becomes smaller than a specified lower limit; and electric power that can be supplied to each of the first storage device and said plurality of second storage devices is limited when the quantity of state of the corresponding storage device exceeds a specified upper limit.

10. The control method of the power supply system according to claim 9, wherein:

the amount of electric power that is allowed to be discharged from each of the first storage device and said plurality of second storage devices is calculated, based on a value obtained by subtracting said lower limit from the quantity of state indicative of the current state of charge of the corresponding storage device, and a storage capacity of the corresponding storage device; and the amount of electric power with which each of the first storage device and the second storage device connected to the second storage device is allowed to be charged is calculated, based on a value obtained by subtracting the quantity of state indicative of the current state of charge of the corresponding storage device from said upper limit, and the storage capacity of the corresponding storage device.

11. The control method of the power supply system according to claim 8, wherein the first converter is controlled so as to regulate a voltage of the power line to a given target voltage, and the second converter is controlled so as to control charge and discharge of the second storage device connected to the second converter, to given target amounts.

12. The control method of the power supply system according to claim 8, wherein the first and second converters are controlled so as to control discharge of each of the first storage device and said plurality of second storage devices so that the quantities of state of the storage devices reach a specified lower limit at the same time, and control charge of each of the first storage device and said plurality of second storage devices so that the quantities of state of the storage devices reach a specified upper limit at the same time.

* * * * *